United States Patent
Wu (10) Patent No.: US 8,693,370 B2
(45) Date of Patent: Apr. 8, 2014

(54) METHOD AND SYSTEM FOR PREVENTING REPEATED UPDATING OF ADDRESS TABLE IN ETHERNET RING NETWORK PROTECTION

(75) Inventor: Shaoyong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 48 days.

(21) Appl. No.: 13/258,297

(22) PCT Filed: Apr. 22, 2010

(86) PCT No.: PCT/CN2010/072070
§ 371 (c)(1),
(2), (4) Date: Mar. 22, 2012

(87) PCT Pub. No.: WO2010/145319
PCT Pub. Date: Dec. 23, 2010

(65) Prior Publication Data
US 2012/0170487 A1 Jul. 5, 2012

(30) Foreign Application Priority Data
Sep. 24, 2009 (CN) .......................... 2009 1 0093513

(51) Int. Cl.
*H04L 12/28* (2006.01)
(52) U.S. Cl.
USPC ........... 370/254; 370/218; 370/225; 370/258; 370/400
(58) Field of Classification Search
USPC ......... 370/218, 222, 225, 228, 254–258, 400, 370/401
See application file for complete search history.

(56) References Cited

U.S. PATENT DOCUMENTS 5,724,346 A * 3/1998 Kobayashi et al. ............ 370/329
6,128,296 A * 10/2000 Daruwalla et al. ............ 370/389
(Continued)

FOREIGN PATENT DOCUMENTS

| CN | 1747438 A | 3/2006 |
| CN | 101043433 A | 9/2007 |

(Continued)

OTHER PUBLICATIONS

International Search Report in international application No. PCT/CN2010/072070, mailed on Jul. 29, 2010.

(Continued)

*Primary Examiner* — Andrew Lai
*Assistant Examiner* — Andrew C Lee
(74) *Attorney, Agent, or Firm* — Oppedahl Patent Law Firm LLC (57) ABSTRACT

The present disclosure discloses a method for preventing repeated updating of an address table in Ethernet ring network protection, including: an Ethernet ring network node sends an Ethernet ring network protection protocol frame and encapsulates its own node information into the Ethernet ring network protection protocol frame; an Ethernet ring network node receives the Ethernet ring network protection protocol frame and matches the node information encapsulated in the received Ethernet ring network protection protocol frame with its own node information; and when the matching is successful, the Ethernet ring network node does not update the address table. The present disclosure further discloses a system for preventing repeated updating of an address table in Ethernet ring network protection. In the system, a matching unit is used for matching the node information encapsulated in the received Ethernet ring network protection protocol frame with the node information of an Ethernet ring network node itself; and when the matching is successful, the Ethernet ring network node does not update the address table. Through the method and system of the disclosure, the problem of repeated updating of an address table in Ethernet ring network protection in the scenario of requesting local protection switching can be solved.

6 Claims, 4 Drawing Sheets

(56) References Cited

U.S. PATENT DOCUMENTS

| | | | |
|---|---|---|---|
| 6,151,297 A * | 11/2000 | Congdon et al. | 370/216 |
| 6,445,709 B1 * | 9/2002 | Chiang | 370/399 |
| 6,766,482 B1 | 7/2004 | Yip et al. | |
| 6,928,050 B2 * | 8/2005 | Lynch et al. | 370/224 |
| 6,990,106 B2 * | 1/2006 | Bhatia | 370/395.53 |
| 7,003,705 B1 | 2/2006 | Yip et al. | |
| 7,313,633 B2 * | 12/2007 | Beverly | 709/245 |
| 7,434,254 B1 * | 10/2008 | Foschiano et al. | 726/13 |
| 7,440,397 B2 * | 10/2008 | Tsurumi et al. | 370/222 |
| 7,752,290 B2 * | 7/2010 | Ebata | 709/222 |
| 7,869,439 B1 * | 1/2011 | Ramberg et al. | 370/395.54 |
| 7,916,723 B2 * | 3/2011 | Fan et al. | 370/389 |
| 8,111,613 B2 * | 2/2012 | McGuire et al. | 370/218 |
| 8,149,692 B2 * | 4/2012 | Holness et al. | 370/222 |
| 2004/0223503 A1 * | 11/2004 | Lynch et al. | 370/404 |
| 2005/0243823 A1 * | 11/2005 | Griswold et al. | 370/389 |
| 2006/0245351 A1 * | 11/2006 | Pande et al. | 370/216 |
| 2008/0095047 A1 * | 4/2008 | Skalecki et al. | 370/225 |
| 2008/0118244 A1 * | 5/2008 | Nakada | 398/59 |
| 2008/0275999 A1 | 11/2008 | Yanagihara | |
| 2009/0052317 A1 * | 2/2009 | Takagi et al. | 370/223 |
| 2009/0147672 A1 | 6/2009 | Chun et al. | |
| 2009/0296569 A1 * | 12/2009 | Ramalho Ribeiro Dos Santos et al. | 370/222 |
| 2009/0316571 A1 * | 12/2009 | Rose | 370/218 |
| 2010/0165883 A1 * | 7/2010 | Holness et al. | 370/255 |
| 2010/0238813 A1 * | 9/2010 | Allan et al. | 370/252 |

FOREIGN PATENT DOCUMENTS

| | | |
|---|---|---|
| CN | 101127673 A | 2/2008 |
| CN | 101309161 A | 11/2008 |
| CN | 101426031 A | 5/2009 |
| CN | 101499947 A | 8/2009 |
| CN | 101217507 A | 6/2012 |
| EP | 2023542 A1 | 2/2009 |

OTHER PUBLICATIONS

English Translation of the Written Opinion of the International Search Authority in international application No. PCT/CN2010/072070, mailed on Jul. 29, 2010.

* cited by examiner

METHOD AND SYSTEM FOR PREVENTING REPEATED UPDATING OF ADDRESS TABLE IN ETHERNET RING NETWORK PROTECTION

TECHNICAL FIELD

The present disclosure relates to an Ethernet protection technology, in particular to a method and system for preventing repeated updating of an address table in Ethernet ring network protection.

BACKGROUND

With the development of Ethernet towards a multi-service bearer, particularly the increasing requirements of some services on the reliability and real-time property of a network, the Ethernet widely adopts a ring network to improve the reliability of the network. In addition, in the protection solution for a ring network, it is generally required that fast protection switching can be completed within 50 ms. At present, the technology for fast protection switching can be implemented based on the G.8032 protocol of the International Telecommunication Union (ITU-T).

Based on the G.8032 protocol, an automatic protection switching protocol and mechanism is defined for an Ether layer of a ring topological Ethernet. A network protection method is adapted to the ring topological Ethernet, and implemented by such a flow: a link is selected as a ring protection link in a ring topological Ethernet; one node adjacent to the ring protection link, which is called a node to which the ring protection link belongs, controls the blocking or opening of the ring protection link, and a port at the node to which the ring protection link belongs, which is adjacent to the ring protection link, is called a port adjacent to the ring protection link. When all the links of the Ethernet ring network are normal, at least one of two nodes adjacent to the ring protection link blocks a port connected with the ring protection link to prevent protected data from passing through the ring protection link, in this way, there is only one communication path between any two nodes in the Ethernet ring network, so never a closed communication path exists in the Ethernet ring network, thus a closed loop and a network storm are prevented; when a link in the Ethernet ring network has a failure, if the failed link is not the ring protection link, then the nodes at the ports adjacent to the ring protection link are blocked and the blocked ports on the ring protection link are opened, so that protected data can pass through the ring protection link, a new communication path is generated between any two nodes on the ring protection link, the re-connection of the communication path is guaranteed and the reliability of the network improved.

In the switching process of an Ethernet ring network, a communication path of a data flow needs a change, since information in an address table recorded by each node may be not available any longer after the communication path of the data flow is changed, each node may need to update the address table, specifically, deleting address items of ports of a ring. In the G.8032 protocol, when a node sends an Ethernet ring network protection protocol frame, the protocol frame includes a node number of the node and an index number of a blocked port; after other nodes receive the protocol frame, the node number and the index number of the blocked port in the protocol frame are extracted and compared with those of updating record information which is originally stored and corresponding to a receiving port; if they are different, the updating record information corresponding to the receiving port is updated with the extracted node number and the index number of the blocked port; and if the node number and the index number of the blocked port in the protocol frame are different from those of updating record information corresponding to the opposite end port of the receiving port, the node may further need to update the address table.

Although such solution for updating an address table in an Ethernet ring network guarantees that error address items can be fast deleted during switching in the Ethernet ring network, the problem of repeated updating during the switching is also caused. For example, in the scenarios of switchback after link failure restoration, link unidirectional failure, manual switch protection switching request, forced switch protection switching request and other such local protection switching requests, if a node sends an Ethernet ring network protection protocol frame and has updated the address table of its own when making a local protection switching request, then, after the node receives the Ethernet ring network protection protocol frame sent by itself, the node repeatedly updates the address table once more because original node number and index number of a blocked port in updating record information of a port are not consistent with the information contained in the received protocol frame. At present, there is still no effective solution for how to prevent repeated updating of an address table in Ethernet ring network protection.

SUMMARY

In view of the above problem, the present disclosure aims to provide a method and system for preventing repeated updating of an address table in Ethernet ring network protection, which can solve the problem of repeated updating of an address table in Ethernet ring network protection in the scenario of requesting local protection switching.

In order to achieve the above objective, the technical solution of the disclosure is implemented as follows:

a method for preventing repeated updating of an address table in Ethernet ring network protection, including: encapsulating, by an Ethernet ring network node, node information of the Ethernet ring network node into an Ethernet ring network protection protocol frame when the node sends the Ethernet ring network protection protocol frame; when an Ethernet ring network node receives the Ethernet ring network protection protocol frame, matching, by the Ethernet ring network node, the node information encapsulated in the received Ethernet ring network protection protocol frame with node information of the Ethernet ring network node itself; and not updating the address table by the Ethernet ring network node when the matching is successful; wherein the node information of the Ethernet ring network node itself is the only information identifying the identity of the node.

Wherein, when the node information of the Ethernet ring network node itself is a node number, the matching may further include: a sending node number encapsulated in the Ethernet ring network protection protocol frame received by the Ethernet ring network node is matched with the node number of the Ethernet ring network node, and the matching is successful when the sending node number and the node number of the Ethernet ring network node are the same.

Wherein, before the matching, the method may further include: executing protection switching by the Ethernet ring network node when the Ethernet ring network node receives a local protection switching request.

Wherein, in the scenario of a switchback, the method may further include:

generating, by a node to which a ring protection link belongs, a local protection switching request upon the running out of a wait-to-restore timer when the node to which the ring protection link belongs is in a pending state and after the wait-to-restore timer runs out;

blocking, by the node to which the ring protection link belongs, a port adjacent to the ring protection link and sending a ring protection link blockage protocol frame to inform other nodes to perform switching, wherein the node number of the node to which the ring protection link belongs is encapsulated into the ring protection link blockage protocol frame; and receiving, by the node to which the ring protection link belongs, the ring protection link blockage protocol frame sent by the node itself and matching a sending node number extracted from the ring protection link blockage protocol frame with the node number of the node itself; and not updating the address table by the node to which the ring protection link belongs when the sending node number and the node number of the node to which the ring protection link belongs are the same and the matching is successful.

A system for preventing repeated updating of an address table in Ethernet ring network protection, including: a sending unit, a matching unit and an updating executing unit, wherein the sending unit is used for an Ethernet ring network node to send an Ethernet ring network protection protocol frame and encapsulate node information of the Ethernet ring network node itself into the Ethernet ring network protection protocol frame; wherein the node information of the Ethernet ring network node itself is the only information identifying the identity of the node;

the matching unit is used for an Ethernet ring network node to match the node information encapsulated in the received Ethernet ring network protection protocol frame with node information of the Ethernet ring network node itself when the Ethernet ring network node receives the Ethernet ring network protection protocol frame, and to send the matching result to the updating executing unit; and the updating executing unit is used for the Ethernet ring network node not to update the address table when the matching result is that the matching is successful.

Wherein, the matching unit may be further used for matching a sending node number encapsulated in the Ethernet ring network protection protocol frame received by the Ethernet ring network node itself with the node number of the Ethernet ring network node itself when the node information of the Ethernet ring network node itself is a node number;

wherein, when the sending node number is the same as the node number of the Ethernet ring network node itself, the matching result is that the matching is successful.

Wherein, the system may further include: a protection switching executing unit which is used for an Ethernet ring network node to receive a local protection switching request and execute protection switching.

Wherein, the protection switching executing unit may be further used for a node to which a ring protection link belongs to receive a local protection switching request upon the running out of a wait-to-restore timer and executing the protection switching in the scenario of a switchback;

the sending unit may be further used for the node to which the ring protection link belongs to block a port adjacent to the ring protection link and send a ring protection link blockage protocol frame to inform other nodes to perform switching, wherein the node number of the node to which the ring protection link belongs is encapsulated into the ring protection link blockage protocol frame;

the matching unit may be further used for the node to which the ring protection link belongs to receive the ring protection link blockage protocol frame sent by the node itself and match a sending node number extracted from the ring protection link blockage protocol frame with the node number of the node itself; and the updating executing unit may be used for the node to which the ring protection link belongs not to update the address table when the sending node number is the same as the node number of the node to which the ring protection link belongs.

In the disclosure, an Ethernet ring network node encapsulates its own node information into an Ethernet ring network protection protocol frame when sending the Ethernet ring network protection protocol frame; an Ethernet ring network node matches the node information encapsulated in the received Ethernet ring network protection protocol frame with node information of the Ethernet ring network node itself when receiving the Ethernet ring network protection protocol frame; and the Ethernet ring network node does not update an address table when the matching is successful; wherein the node information of the Ethernet ring network node itself is the only information identifying the identity of the node.

In the disclosure, whether to update an address table is determined by matching node information encapsulated in a protocol frame with node information of an Ethernet ring network node, and when they are the same, the address table is not updated; therefore, the Ethernet ring network node which has updated its own address table when executing protection switching does not need to repeatedly update the address table any longer when receiving the Ethernet ring network protocol frame sent by itself, thereby effectively preventing the repeated updating of the address table.

DETAILED DESCRIPTION

The basic idea of the disclosure is: determining whether to update an address table by matching node information encapsulated in a protocol frame with node information of an Ethernet ring network node; and not updating the address table when they are the same.

The implementation of the technical solution is further described in detail with reference to the drawings below.

The disclosure is described below in comparison with the prior art in order to better show the advantages of the disclosure over the prior art.

Figure 1:
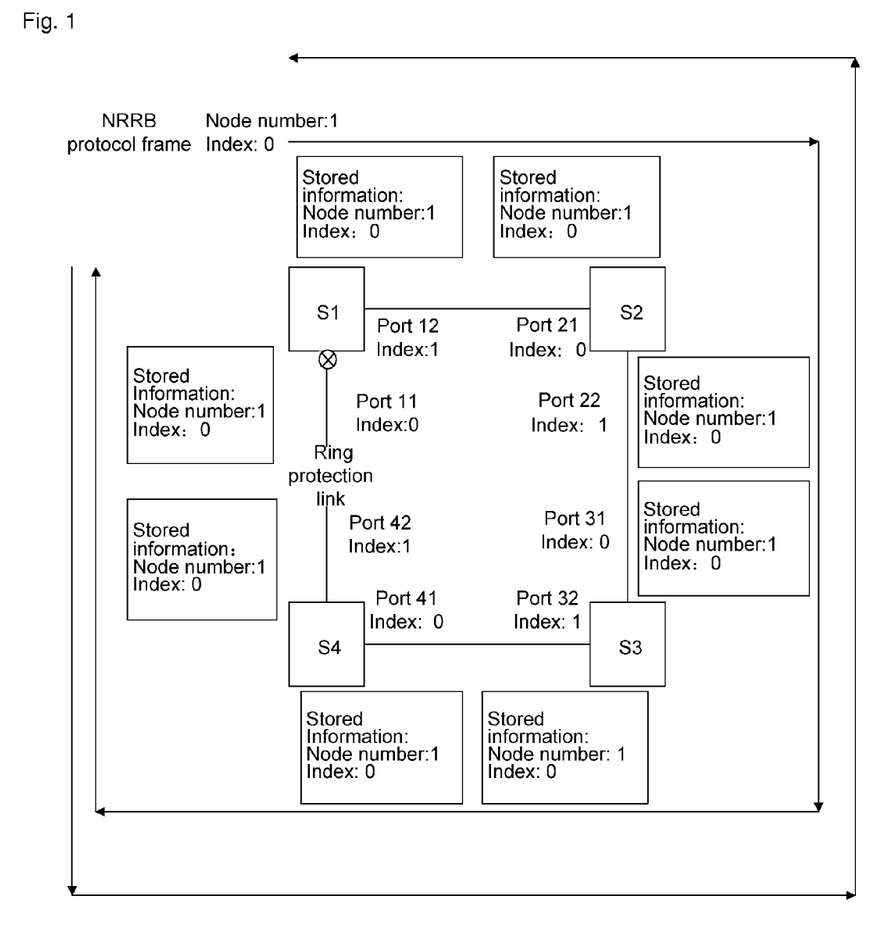
FIG. 1 shows a schematic diagram of the operation of a normal Ethernet ring network link.

In terms of the prior art, FIG. 1 shows a schematic diagram of an existing Ethernet ring network protection structure based on G.8032; as shown in FIG. 1, nodes S1, S2, S3 and S4 form an Ethernet ring network; a link between the nodes S1 and S4 is a ring protection link, the node S1 is a node to which a ring protection link belongs, and makes the ring protection link blocked or open by controlling the blocking or opening of a port 11; the port blockage here refers to that a blocked node port cannot forward protected data but can still receive or send an Ethernet ring network protection protocol frame based on the G.8032. When the Ethernet ring network link shown in FIG. 1 has no failure, the node S1 blocks the port 11 to prevent protected data from passing through the ring protection link, i.e., to prevent protected data from being forwarded by the node S1, and a communication path of a protected data flow between the nodes S2 and S3 is only S2<->S3 instead of S2<->S1<->S4<->S3, so never exists a closed communication path in the ring network and a network storm is prevented. When all links in the Ethernet ring network are normal, a node to which a ring protection link belongs periodically sends a ring protection link blockage protocol frame to inform other nodes of that the ring protection link is in a blocked state; the ring protection link blockage protocol frame includes a node number of a sending node and an index number of a blocked port; after receiving the protocol frame, other nodes extract the node number and the index number of the blocked port from the protocol frame and compare them with those originally stored in updating record information corresponding to a receiving port; if they are different, the updating record information corresponding to the receiving port is updated with the node number and the index number of the blocked port extracted; and when the Ethernet ring network is stable, the updating record information corresponding to a port on each node ring stores a node number of a node to which the ring protection link belongs and an index number of a blocked port. For example, a node number and an index number of a blocked port in updating record information on a port 41 of the node S4 are 1 and 0 respectively; and a node number and an index number of a blocked port in updating record information on a port 42 are 1 and 0 respectively.

Figure 2:
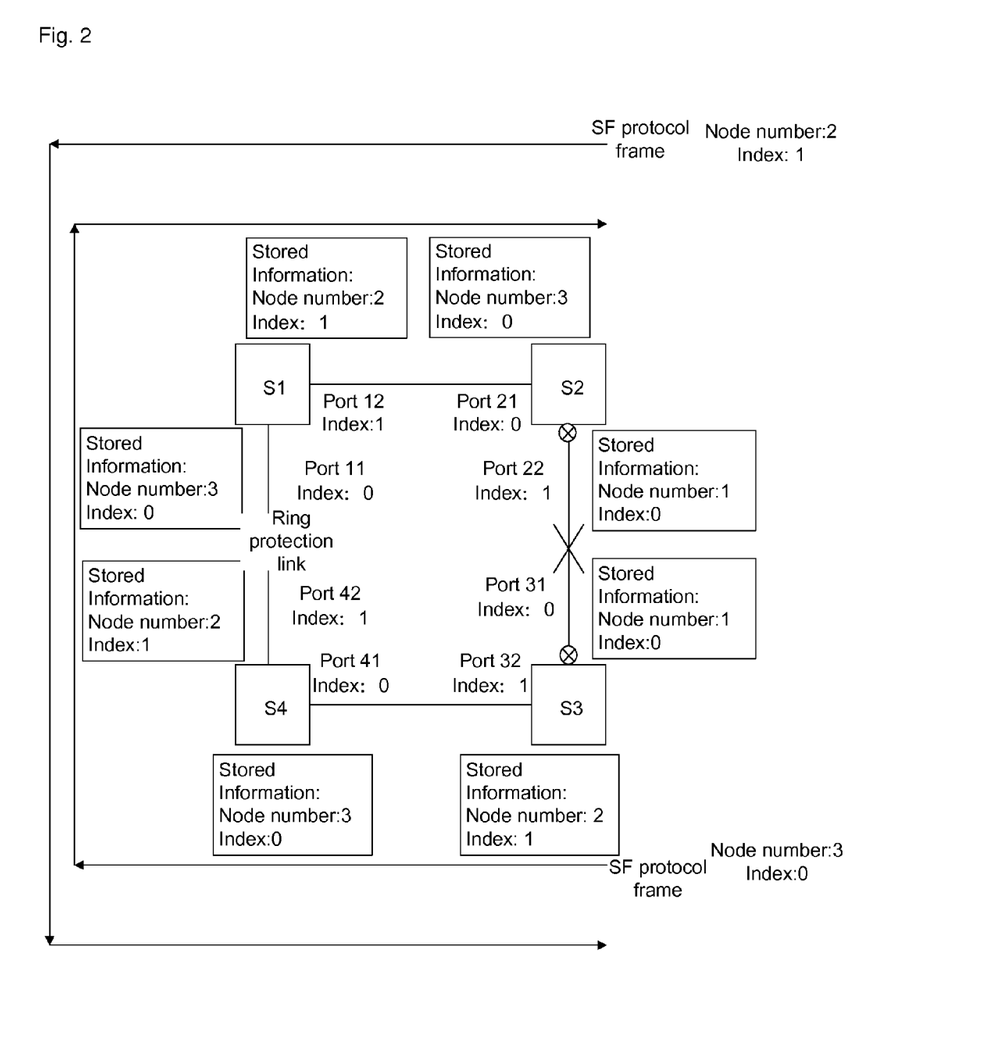
FIG. 2 shows a schematic diagram of the operation of a failed Ethernet ring network link.

FIG. 2 shows a schematic diagram of an Ethernet ring network protection structure after a failure occurs in the Ethernet ring network link in FIG. 1; as shown in FIG. 2, if having detected the link failure, the nodes S2 and S3 firstly block ports 22 and 31 connected with the failure link respectively and send a link failure warning protocol frame to inform other nodes to perform protection switching; then, the node S1 to which the ring protection link belongs opens the blocked port 11 connected with the ring protection link after receiving the link failure warning protocol frame which includes the node numbers of the sending nodes and the index numbers of the blocked ports; after receiving the protocol frame, other nodes extract the node numbers and the index numbers of the blocked ports from the protocol frame and compare them with those originally stored in updating record information which is corresponding to the receiving port; and if they are different, the updating record information corresponding to the receiving port is updated with the node numbers and the index numbers of the blocked ports extracted, moreover, the address table needs to be updated. For example, when the node S4 receives a link failure warning protocol frame from the node S3 at the port 41 for the first time after a link failure, the node number included in the protocol frame is 3 and the index number of the blocked port is 0, and the node S4 finds out by comparison that the node number and the index number of the blocked port are different from those originally in updating record information on the port 41, therefore, the updating record information on the port 41 is updated with new node number 3 and the index number 0 of the blocked port, and the node S4 also needs to update the address table.

Although the existing solution for updating an address table of an Ethernet ring network guarantees that error address items can be fast deleted during switching in an Ethernet ring network, the problem of repeated updating in the process of switching is also caused. For example, in the scenario of a switchback after link restoration, a node to which a ring protection link belongs may repeatedly update the address table. When there is a failure or other protection switching requests in the Ethernet ring network, a new blocked port will be generated; and if the new blocked port is not the original blocked port adjacent to the ring protection link, the port adjacent to the ring protection link will be opened. When the factors for generating protection switching disappear, for example, the failure is corrected, if the Ethernet ring network is arranged in a return mode, the node to which the ring protection link belongs enters a pending state and a wait-to-restore timer is started; if the node to which the ring protection link belongs is in a pending state and after the wait-to-restore timer runs out, the Ethernet ring network will perform a switchback. The switchback specifically includes: when the node to which the ring protection link belongs is in a pending state and after the wait-to-restore timer runs out, the node firstly blocks a port adjacent to the ring protection link, sends a ring protection link blockage protocol frame to inform other nodes to perform switchback, then updates the address table, and other nodes open the port and update the address table after receiving the ring protection link blockage protocol frame. When the node to which the ring protection link belongs receives a ring protection link blockage protocol frame sent by itself for the first time, it will update the address table once more because the node number and the index number of a blocked port in the original updating record information on the port are not consistent with those included in the protocol frame received, however, this updating is actually unnecessary and will cause another broadcasting after a flow is stabilized. For example, in FIG. 1, when a link failure happens between the nodes S2 and S3, a node number and an index number of a blocked port in updating record information stored by the port 12 of the node S1 are 2 and 1 respectively; after the link failure between the nodes S2 and S3 is corrected, the node S1 performs a switchback, and when the node S1 is in a pending state and after the wait-to-restore timer runs out, the node S1 firstly blocks the port 11 and then sends a ring protection link blockage protocol frame in which a node number and an index number of a blocked port are 1 and 0 respectively, next, the node S1 updates the address table, and other nodes opens the blocked port and updates the address table after receiving the ring protection link blockage protocol frame; when the node S1 receives the ring protection link blockage protocol frame sent by itself, because the node number and the index number of the blocked port included in the protocol frame are not consistent with the updating record information originally stored by the receiving port, the node S1 repeatedly updates the address table once more, which is actually unnecessary.

In addition, in the Ethernet ring network protection, besides the switchback after link failure restoration, link unidirectional failure, manual switch protection switching request, forced switch protection switching request and the like also cause repeated updating of the address table. The switchback after link failure restoration, link unidirectional failure, manual switch protection switching request and forced switch protection switching request are local protection switching requests, that is, the protection switching is driven by a local event rather than by a remote Ethernet ring network protection protocol frame. In the scenario of requesting local protection switching, the basic reason for the repeated updating of the address table is that: a node sends an Ethernet ring network protection protocol frame and has updated its own address table when performing local protection switching, however, after receiving the Ethernet ring network protection protocol frame sent by the node itself, the node repeatedly updates the address table once more because a node number and an index number of a blocked port in the original updating record information on the port are not consistent with the information included in the received protocol frame.

Therefore, the disclosure is provided as the time requires; through the improved updating solution of the disclosure, an Ethernet ring network protection node firstly sends an Ethernet ring network protection protocol frame which includes a node number of the Ethernet ring network protection node, when performing locally requested protection switching; later, when the node receives the Ethernet ring network protection protocol frame, the node compares the node number in the protection switching protocol frame with its own node number, and if they are the same, then address updating is not performed. By adopting the disclosure, a node executing a local protection switching request does not need to update the address table when receiving an Ethernet ring network protection protocol frame sent by the node itself because the node has updated its own address table when performing the protection switching; by comparing the received protocol frame, the node will not repeatedly update the address table any longer when receiving an Ethernet ring network protection protocol frame sent by the node itself, thereby effectively preventing the repeated updating of the address table.

The solution for preventing repeated updating of an address table in Ethernet ring network protection in the disclosure is specifically described below.

A method for preventing repeated updating of an address table in Ethernet ring network protection, includes: an Ethernet ring network node encapsulates its own node information into an Ethernet ring network protection protocol frame when the Ethernet ring network node sends the Ethernet ring network protection protocol frame; when an Ethernet ring network node receives the Ethernet ring network protection protocol frame, it matches the node information encapsulated in the received Ethernet ring network protection protocol frame with its own node information; and the Ethernet ring network node does not update the address table when the matching is successful; wherein the node information is the only information identifying the identity of the node.

It should be noted that, the Ethernet ring network node sending an Ethernet ring network protection protocol frame may be not the node later receiving the Ethernet ring network protection protocol frame. The node performing matching is the one later receiving the Ethernet ring network protection protocol frame; that is to say, when the matching is successful, the Ethernet ring network node receiving the Ethernet ring network protection protocol frame does not update the address table. The node information can be a node number, i.e., an individual Media Access Control (MAC) address assigned to each node. However, the disclosure does not exclude other identifying methods, for example, each node is given an individual name.

Here, when the node information is a node number, the matching further includes: a sending node number encapsulated in an Ethernet ring network protection protocol frame received by an Ethernet ring network node is matched with a node number of the Ethernet ring network node, and the matching is successful when the sending node number and the node number of the Ethernet ring network node are the same.

Here, before the matching, the method further includes: the Ethernet ring network node executes protection switching when it receives a local protection switching request.

It should be pointed out that, the scenario of requesting local protection switching specifically includes: the scenario of switchback after link failure restoration, the scenario of link unidirectional failure, the scenario of requesting manual switch protection switching, the scenario of requesting forced switch protection switching, the scenario of link bidirectional failure, and the like. The Ethernet ring network nodes involved in the disclosure are adapted to all nodes in the Ethernet ring network and not limited to protection nodes.

Here, when the scenario of requesting local protection switching is a switchback scenario, the method further includes the following steps:

step 101: when a node to which a ring protection link belongs is in a pending state and after a wait-to-restore timer runs out, a local protection switching request upon the running out of the wait-to-restore timer is generated;

step 102: the node to which the ring protection link belongs blocks a port adjacent to the ring protection link and sends a ring protection link blockage protocol frame to inform other nodes to perform switching, wherein the node number of the node to which the ring protection link belongs is encapsulated into the ring protection link blockage protocol frame; and step 103: the node to which the ring protection link belongs receives the ring protection link blockage protocol frame sent by itself and matches the sending node number extracted from the ring protection link blockage protocol frame with the node number of itself; when the sending node number is the same as the node number of itself, the matching is successful and the node to which the ring protection link belongs does not update the address table.

To sump up, the disclosure mainly includes the following contents: an Ethernet ring network node encapsulates its own node number information into an Ethernet ring network protection protocol frame when sending the Ethernet ring network protection protocol frame; an Ethernet ring network node compares the node number in the received Ethernet ring network protection protocol frame with the node number of itself when receiving the Ethernet ring network protection protocol frame; and if the node number of the Ethernet ring network node is the same as the node number in the received Ethernet ring network protection protocol frame, then the Ethernet ring network node does not update the address table.

In the disclosure, an Ethernet ring network node has updated its own address table when performing a local protection switching request, therefore, when receiving an Ethernet ring network protection protocol frame sent by itself, if the Ethernet ring network node finds out that the protocol frame is sent by itself by comparing its own node number with the node number in the protocol frame, then the address table will not be repeatedly updated any longer, thereby the repeated updating of the address table is effectively prevented, the flow broadcasting during the protection switching in the Ethernet ring network is reduced and the switching efficiency is improved.

The disclosure is described below through examples.

Embodiment

Figure 3:
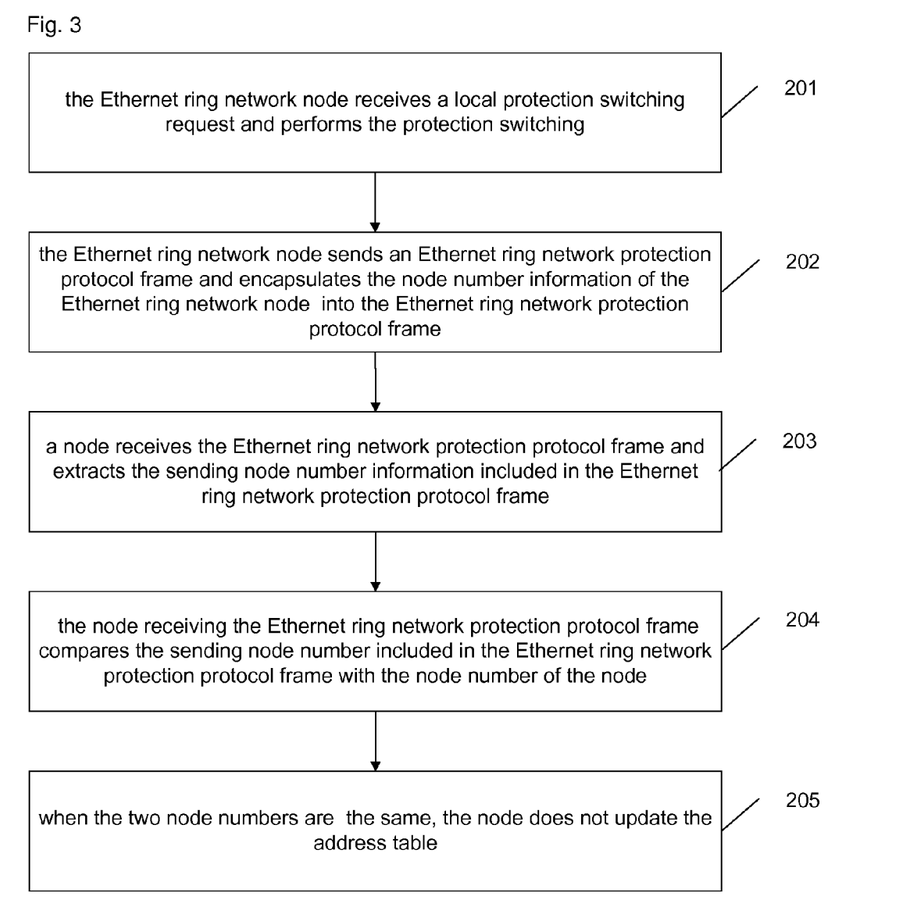
FIG. 3 shows a schematic diagram of an implementation flow of a method embodiment of the disclosure.

FIG. 3 shows a flowchart of a method for preventing repeated updating of an address table in Ethernet ring network protection in the disclosure, including the following steps:

step 201: an Ethernet ring network node receives a local protection switching request and performs protection switching;

step 202: the Ethernet ring network node sends an Ethernet ring network protection protocol frame, and encapsulates the node number information of itself into the Ethernet ring network protection protocol frame;

step 203: an Ethernet ring network node receives the Ethernet ring network protection protocol frame and extracts the sending node number information included in the protocol frame;

step 204: the node receiving the Ethernet ring network protection protocol frame compares the sending node number included in the Ethernet ring network protection protocol frame with the node number of itself; and step 205: when the sending node number included in the Ethernet ring network protection protocol frame is the same as the node number of the Ethernet ring network node receiving the frame, then the node does not update the address table.

The technical solution of the disclosure is further described in detail in combination with a specific example below.

Example

In the scenario of a switchback, a node to which a ring protection link belongs is prevented from repeatedly updating an address table by the method of the disclosure.

Figure 4:
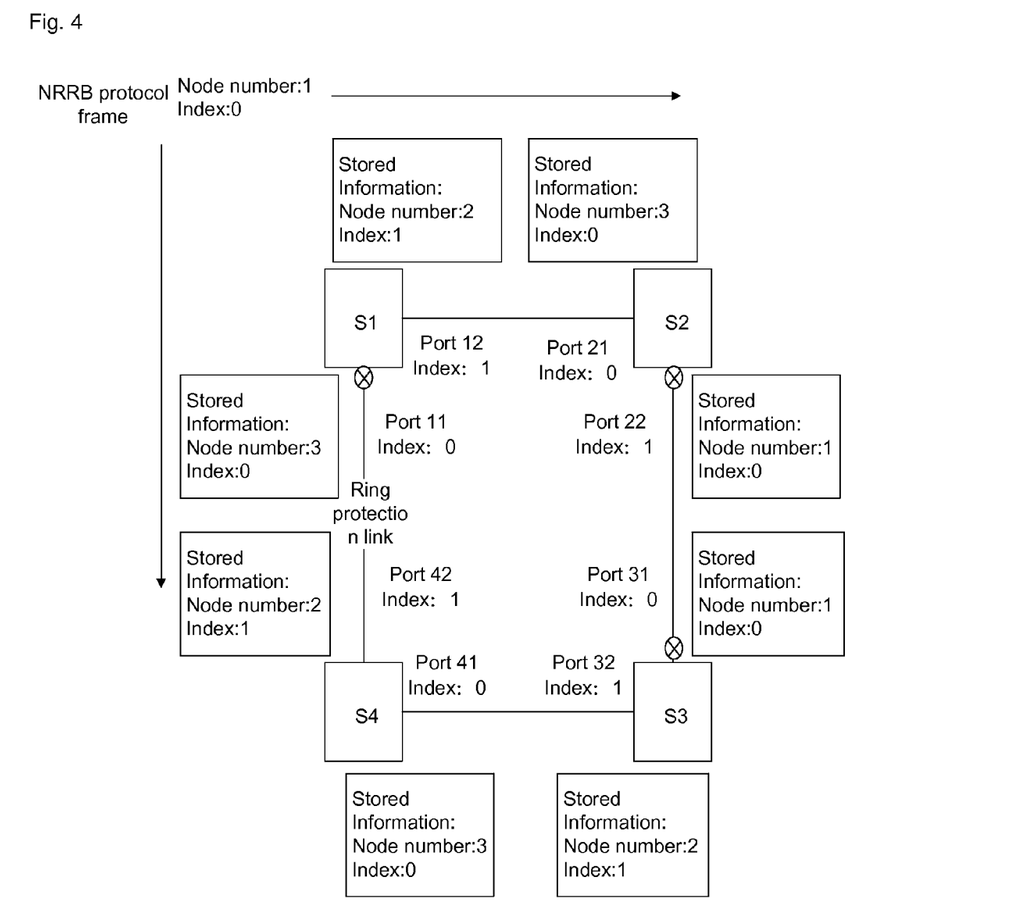
FIG. 4 shows a schematic diagram of the operation of an example of the disclosure.

FIG. 4 shows a topological diagram of an Ethernet ring network of the disclosure; a link between nodes S2 and S3 has a failure; after the link is restored, a node S1 to which a ring protection link belongs starts a wait-to-restore timer and enters a pending state; when the node S1 is in the pending state and after the wait-to-restore timer runs out, a local protection switching request is generated upon the running out of the wait-to-restore timer; the node S1 firstly blocks a port 11 adjacent to the ring protection link and then sends a ring protection link blockage protocol frame to inform other nodes to perform switching; a node number included in the ring protection protocol frame is 1 and the node S1 will still update the address table. When the node S1 receives the ring protection protocol frame sent by itself, by comparison, the node number included in the protocol frame is the same as the node number of the node S1, so the node S1 will not repeatedly update the address table.

A system for preventing repeated updating of an address table in Ethernet ring network protection, includes: a sending unit, a matching unit and an updating executing unit; wherein the sending unit is used for an Ethernet ring network node to send an Ethernet ring network protection protocol frame and encapsulate its own node information into the Ethernet ring network protection protocol frame, the node information being the only information identifying the identity of the node; the matching unit is used for the Ethernet ring network node to match the node information encapsulated in the received Ethernet ring network protection protocol frame with the node information of the Ethernet ring network node when the Ethernet ring network node receives the Ethernet ring network protection protocol frame, and to send the matching result to the updating executing unit; and the updating executing unit is used for the Ethernet ring network node not to update the address table when the matching result is that the matching is successful.

Here, the matching unit is further configured to match the sending node number encapsulated in the Ethernet ring network protection protocol frame received by the Ethernet ring network node with the node number of the Ethernet ring network node itself when the node information is a node number; wherein, when the sending node number is the same as the node number of the Ethernet ring network node, the matching result is that the matching is successful.

Here, the system further includes: a protection switching executing unit which is used for a Ethernet ring network node to receive a local protection switching request and execute protection switching.

The implementation of each unit in the system is described below in the scenario of a switchback.

In the scenario of a switchback, the protection switching executing unit is further used for the node to which the ring protection link belongs to receive a local protection switching request upon the running out of a wait-to-restore timer and execute protection switching; the sending unit is further used for the node to which the ring protection link belongs to block a port adjacent to the ring protection link and send a ring protection link blockage protocol frame to inform other nodes to perform switching, wherein the node number of the node to which the ring protection link belongs is encapsulated into the ring protection link blockage protocol frame; the matching unit is further used for the node to which the ring protection link belongs to receive the ring protection link blockage protocol frame sent by itself and match the sending node number extracted from the ring protection link blockage protocol frame with the node number of itself; and the updating executing unit is used for the node to which the ring protection link belongs not to update the address table when the sending node number is the same as the node number of the node to which the ring protection link belongs and the matching is successful.

Here, the ring protection link blockage protocol frame referred above can be represented by an NRRB frame; the link failure warning protocol frame can be represented by an SF frame; the return mode can be represented by a Revertive mode; the pending state can be represented by a Pending state; a restore timer can be represented by Wait to Restore (WTR); the manual switch protection switching request can be represented by Manual Switch (MS); and the forced switch protection switching request can be represented by Forced Switch (FS).

The above descriptions are only the preferred embodiments of the present disclosure, but are not used to limit the protection scope of the disclosure.

The invention claimed is:

1. A method for preventing repeated updating of an address table in Ethernet ring network protection, comprising:
receiving, by an Ethernet ring network node, an Ethernet ring network protection protocol frame from a sending node;
extracting, by the Ethernet ring network node, a node information included in the Ethernet ring network protection protocol frame, wherein the node information was encapsulated by the sending node;
matching, by the Ethernet ring network node, a sending node number included in the received Ethernet ring network protection protocol frame with a node number included in the node information of the Ethernet ring network node itself;
when the two node numbers are the same, the matching is successful, and the Ethernet ring network node does not update its address—table;
wherein the node information of the Ethernet ring network node itself is only information identifying an identity of the node.

2. The method according to claim 1 further comprising: before the matching, executing protection switching by the Ethernet ring network node when the Ethernet ring network node receives a local protection switching request.

3. The method according to claim 2 further comprising, after recovery switching:
generating, by a node to which a ring protection link belongs, a local protection switching request upon the running out of expiration time of a wait-to-restore timer when the node to which the ring protection link belongs is in a pending state and after the expiration time of the wait-to-restore timer expires;

blocking, by the node to which the ring protection link belongs, a port adjacent to the ring protection link and sending a ring protection link blockage protocol frame to inform other nodes to perform switching, wherein a node number of the node to which the ring protection link belongs is encapsulated into the ring protection link blockage protocol frame; and receiving, by the node to which the ring protection link belongs, the ring protection link blockage protocol frame sent by the node itself and matching a sending node number extracted from the ring protection link blockage protocol frame with the node number of the node itself; and not updating the address table by the node to which the ring protection link belongs when the sending node number and the node number of the node to which the ring protection link belongs are the same and the matching is successful.

4. A system for preventing repeated updating of an address table in Ethernet ring network protection, comprising: a sending unit, a receiving unit, a matching unit and an updating executing unit, wherein a receiving unit is used for an Ethernet ring network node to receive an Ethernet ring network protection protocol frame from a sending node, and extract the node information included in the Ethernet ring network protection protocol frame, wherein the node information was encapsulated by the sending node the sending unit is used for an Ethernet ring network node to send an Ethernet ring network protection protocol frame to any other nodes and encapsulate node information of the Ethernet ring network node itself into the Ethernet ring network protection protocol frame; wherein the node information of the Ethernet ring network node itself is only information identifying an identity of the node;

the matching unit is used for an Ethernet ring network node to compare a sending node number included in the received Ethernet ring network protection protocol frame with the node number included in the node information of the Ethernet ring network node itself;

the updating executing unit is used for not update the address table of the Ethernet ring network node when the two node numbers are the same.

5. The system according to claim 4, further comprising: a protection switching executing unit which is used for an Ethernet ring network node to receive a local protection switching request and execute protection switching.

6. The system according to claim 5, wherein the protection switching executing unit is further used for a node to which a ring protection link belongs to receive a local protection switching request upon the running out of expiration time of a wait-to-restore timer and execute the protection switching after recovery switching;

the sending unit is further used for the node to which the ring protection link belongs to block a port adjacent to the ring protection link and send a ring protection link blockage protocol frame to inform other nodes to perform switching; wherein a node number of the node to which the ring protection link belongs is encapsulated into the ring protection link blockage protocol frame;

the matching unit is further used for the node to which the ring protection link belongs to receive the ring protection link blockage protocol frame sent by the node itself and match a sending node number extracted from the ring protection link blockage protocol frame with the node number of the node itself; and the updating executing unit is used for the node to which the ring protection link belongs not to update the address table when the sending node number is the same as the node number of node to which the ring protection link belongs.

\* \* \* \* \*